July 8, 1941.   L. W. VON LOSBERG   2,248,651
FROZEN CONFECTION MAKING APPARATUS
Filed Dec. 14, 1939   2 Sheets-Sheet 1
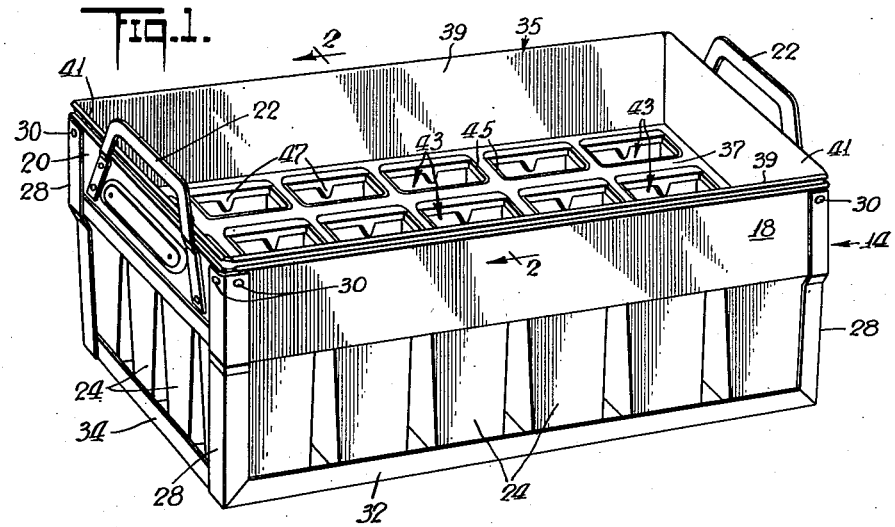
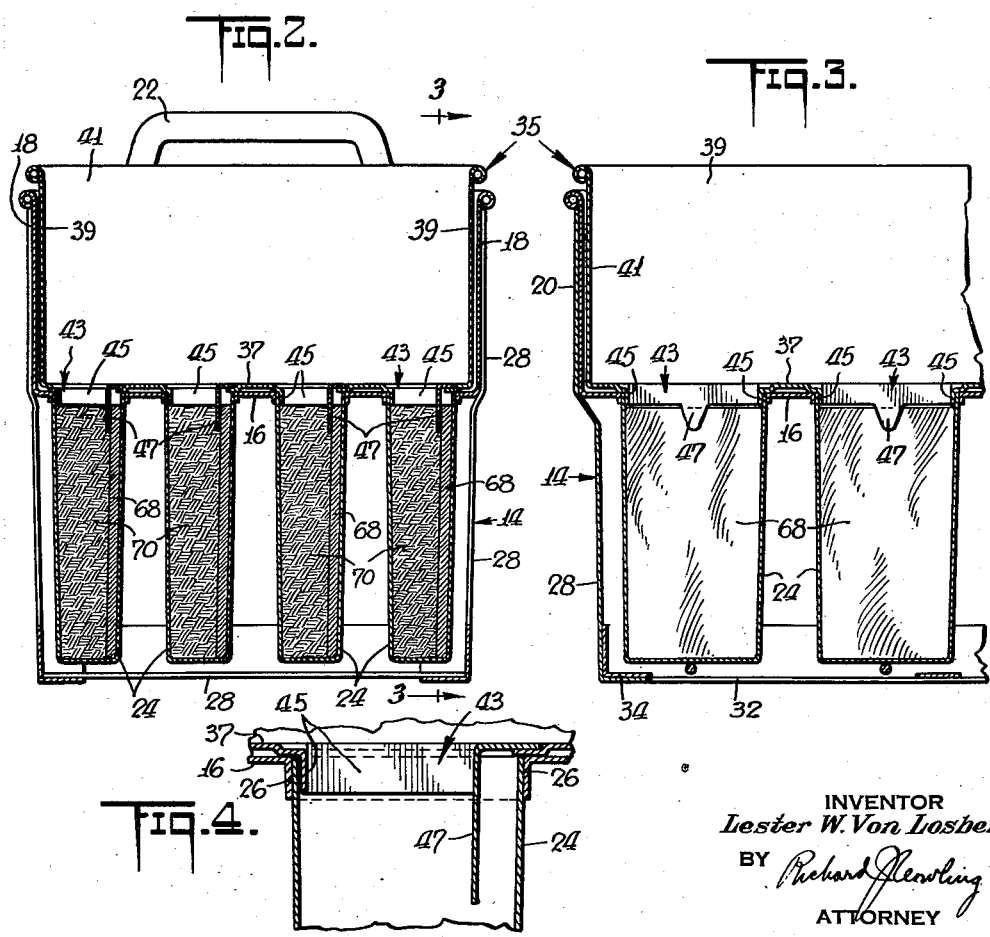
INVENTOR
Lester W. Von Losberg
BY
ATTORNEY July 8, 1941. L. W. VON LOSBERG 2,248,651
FROZEN CONFECTION MAKING APPARATUS
Filed Dec. 14, 1939 2 Sheets-Sheet 2
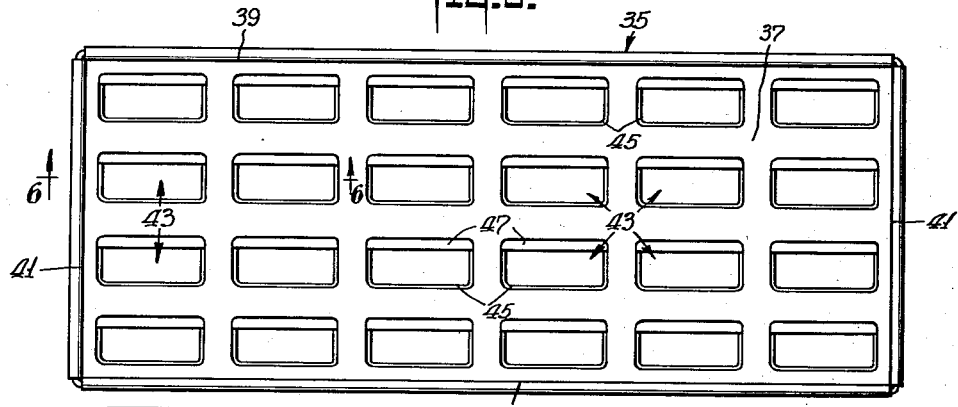
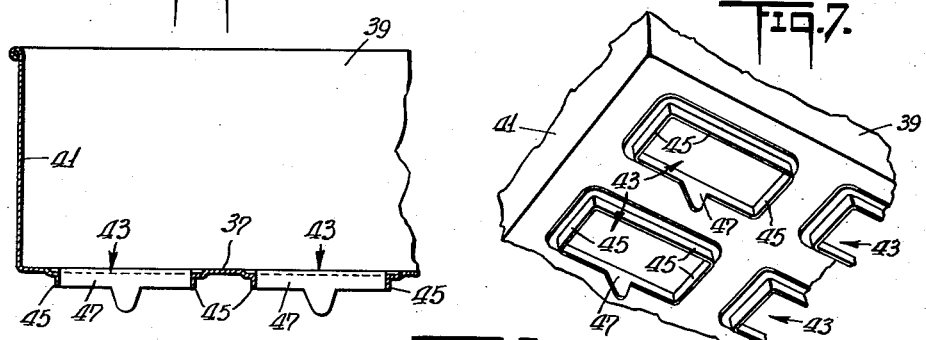
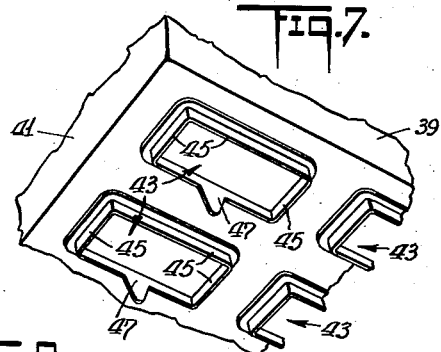
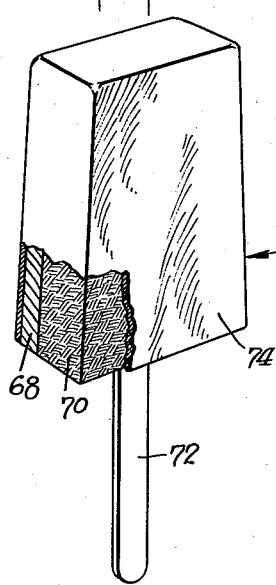
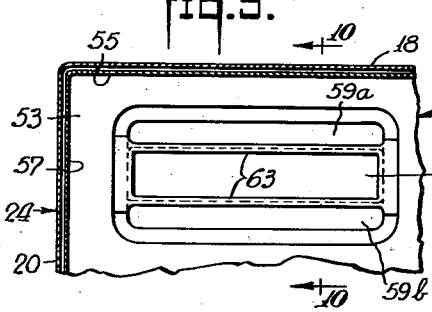
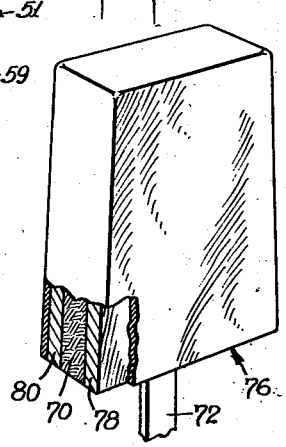
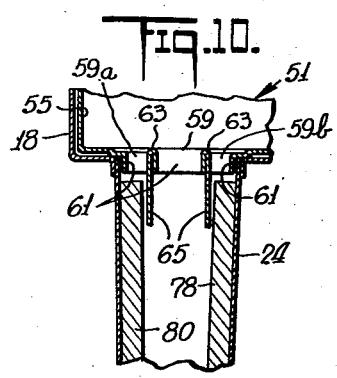
INVENTOR
Lester W. Von Losberg
BY
ATTORNEY Patented July 8, 1941

2,248,651

UNITED STATES PATENT OFFICE 2,248,651

FROZEN CONFECTION MAKING APPARATUS

Lester W. Von Losberg, Teaneck, N. J., assignor to Joe Lowe Corporation, New York, N. Y., a corporation of Delaware Application December 14, 1939, Serial No. 309,145

17 Claims. (Cl. 107—1)

The present invention relates to improvements in frozen confection making apparatus, and it has particular relation to a combination mold structure and filler member suitable for making a composite frozen confectionery product consisting of a block of flavored frozen edible material, such as sherbet, ice milk, ice cream, frozen custard, or like substances, having an edible cake cracker extending along one or more sides thereof. The composite confectionery mass may be covered, if desired, with an edible coating material, such as chocolate, caramel, etc.

An object of the invention is to provide a simple, efficient and inexpensive filler member adapted to hold the edible cake cracker in position in a mold during the operation of filling the remainder of the mold with an edible partially frozen or semi-fluid material.

Another object of the invention is the provision of a durable, economical and sanitary filler member that is suitable for positioning and maintaining a plurality of crackers in a definite and predetermined position in a mold, and also to protect such crackers against breakage during the operation of filling the remainder of the mold with an edible partially frozen or semi-fluid material.

A further object of the invention is to provide a portable filler member adapted to be fitted within a mold structure having a plurality of spaced molds depending therefrom, which is provided with a plurality of correspondingly spaced apertures, each of which is provided with means for positioning and protecting an edible cracker within its respective mold from damage during the operation of filling said mold with an edible partially frozen or semi-plastic material.

Another object of the invention is to provide a portable filler member for a multi-cavity mold structure which is capable of being positioned therein for holding a plurality of edible crackers in spaced relation in each of the molds of said mold structure, and also for protecting said crackers from damage while the molds are being filled with a predetermined quantity of an edible partially frozen or semi-plastic material.

Other and further objects and advantages of the invention reside in the detailed construction of the apparatus, which result in simplicity, economy and efficiency, and which will be apparent from the following description, wherein preferred forms of embodiment of the invention are shown, reference being had to the accompanying drawings, forming a part hereof, wherein like numerals indicate like parts, in which:

Fig. 1 is a perspective view of a combination mold structure and filler member made in accordance with the principles of my invention;

Fig. 2 is a cross-sectional view of the apparatus shown in Fig. 1, the same being taken substantially along the line 2—2 thereof, looking in the direction of the arrows;

Fig. 3 is a fragmentary longitudinal sectional view of the apparatus shown in Fig. 2, the same being taken substantially along the line 3—3 thereof, looking in the direction of the arrows;

Fig. 4 is an enlarged fragmentary sectional view of one of the molds of the mold structure, showing the manner in which the filler member is telescopically positioned thereover;

Fig. 5 is a top plan view of the filler member shown in Fig. 1;

Fig. 6 is an enlarged fragmentary longitudinal sectional view of the filler member shown in Fig. 5, the same being taken along the line 6—6 thereof, looking in the direction of the arrows;

Fig. 7 is an enlarged fragmentary perspective view of the filler member, looking up from the bottom thereof;

Fig. 8 is a perspective view, with parts broken away, of the confectionery product produced with the apparatus shown in Figs. 1 to 7, inclusive;

Fig. 9 is a fragmentary plan view, partly in section, of the mold structure and a modified filler member which is adapted to receive and position a plurality of crackers within a single mold of the mold structure;

Fig. 10 is a fragmentary cross-sectional view of the apparatus shown in Fig. 9, the same being taken substantially along the line 10—10 thereof, looking in the direction of the arrows, and illustrating the position of a plurality of crackers in said mold prior to the filling thereof with an edible partially frozen material; and Fig. 11 is a perspective view, with parts broken away, of the confectionery product produced with the modified form of apparatus shown in Figs. 9 and 10.

Referring now to the drawings, there is shown in Fig. 1, a mold structure 14, consisting of an open-top mold pan 16, having upstanding side walls 18 and end walls 20, the latter being provided with handles 22 for raising and transporting the mold structure 14 as desired. The mold pan 16 has a plurality of individual open-top depending molds 24, which are joined and formed integrally with the mold pan 16 by spot-welding, soldering or other suitable means, as indicated at 26, and as best shown in Fig. 4. The mold structure 14 is provided with angular reinforcing members 28 at the corners thereof, which are spot-welded or riveted, as indicated at 30, to the side walls 18 and end walls 20 of the mold pan 16. The lower ends of the corner members 28 are suitably connected by longitudinally extending angle members 32 and transversely extending angle members 34, forming a box-like frame structure for protecting the depending molds 24. The longitudinal members 32 also serve as supporting runners for facilitating movement of the mold structure 14 over a floor, table or other supporting platform.

The filler member 35 shown in Figs. 1 to 7, inclusive, consists of an open-top filler pan 37, having upstanding side walls 39 and end walls 41, which are adapted to be nestingly or telescopically positioned within the mold structure 14. The filler pan 37 is provided with a plurality of spaced apertures 43, which are correspondingly spaced and shaped to the spacing and shape of the open-tops of the molds 24 so that when the filler member 35 is positioned in the mold structure 14 the apertures 43 are in vertical alignment with the open-tops of the molds 24. Each of the apertures 43 of the filler member 35 is provided with downwardly projecting delivery spouts 45 around a substantial part of its perimeter. In the construction shown in the drawings, where the molds 24 are of a multi-sided shape, the delivery spouts 45 extend around all but one side thereof and engage closely the respective side walls of the mold 24, as best shown in Fig. 4. A downwardly projecting lip member 47, which may be of any desired size or shape, is provided for that portion of the perimeter of the aperture 43 that is not covered by the delivery spout 45. It will be noted that the lip member 47 extends downwardly into the mold 24 in spaced relation to the corresponding adjacent side wall thereof, as best shown in Figs. 3 and 4, and does not engage closely the side walls of the mold 24 as in the case of the delivery spout 45.

The modified form of filler member 51, shown in Figs. 9 and 10, likewise consists of an open-top filler pan 53, having upstanding side walls 55 and end walls 57, which are adapted to be nestingly or telescopically positioned within the upstanding sides of the mold pan 16 of the mold structure 14. The filler pan 53 is also provided with a plurality of spaced apertures 59 which are correspondingly spaced and shaped to the spacing and shape of the open-tops of the molds 24 so that when the filler member 51 is positioned in the mold structure 14 the apertures 59 are in vertical alignment with the open-tops of the molds 24. In this modified construction, each of the apertures 59 of the filler member 51 is provided with downwardly projecting delivery spouts 61 extending entirely around its perimeter, and said spouts 61 are adapted to closely engage the inner surfaces of the open-top molds 24, as best shown in Fig. 10. Each of the apertures 59 is divided by a plurality of spaced longitudinally extending dividing members 63, which are provided with downwardly projecting lip members 65. The lip members 65 are intended to extend downwardly into the molds 24 in spaced relation to each other and to their corresponding sides of the multi-sided mold 24, as best shown in Fig. 10.

In making the frozen confectionery product 66, shown in Fig. 8, using the apparatus shown in Figs. 1 to 7, inclusive, a cracker 68 is positioned in each mold 24 of the mold structure while the same is tilted on an angle to one side. This tilting of the mold structure 14 causes the crackers 68 to gravitationally hug the lower side of the mold 24. When each of the molds 24 has been provided with a cracker 68, the filler member 35 is positioned in the mold structure 14 and is properly aligned therein by its upstanding sides 39 and ends 41 which nestingly or telescopically fit within the upstanding sides 18 and ends 20 of the mold structure 14. In this position, the delivery spouts 45 extend into the open-tops of the molds 24, and being of a corresponding shape and size closely engage the inner surfaces of the sidewalls of said mold 24. The projecting lip member 47, which is designed so as to extend into the mold 24 in spaced relation to its adjacent side thereof, extends downwardly over the cracker 68, which has already been positioned in the mold 24 and kept adjacent the side wall thereof because of its tilted position. The lip member 47 thereafter serves to protect and maintain the cracker 68 in its proper upright position against the side of the mold 24 during the filling operation. The filler member 35 is now ready to receive the material 70 to be frozen. A predetermined amount of the unfrozen or semi-frozen viscous and semi-plastic edible material is deposited in the filler pan 37, and squeegeed in any suitable manner through the apertures 43 into the open-tops of the molds 24. Since only a sufficient quantity of material 70 is placed in the filler pan 37 to fill all of the molds 24, each mold will be entirely filled upon completion of the squeegeeing operation. The filler member 35 may now be removed from the mold structure 14 as the unfrozen, semi-plastic material 70 will serve to maintain the cracker 68 in its proper position during the freezing operation.

A suitable conventional stick positioning apparatus (not shown) may be positioned over the mold structure 14, having a plurality of spaced handles 72 therein adapted to be positioned one centrally of each mold 24. The mold structure 14 is now ready to be placed under refrigeration until its contents are solidily frozen and bonded to the cracker 68 and handle member 72. Upon removal of the confectionery product from the mold 24, it may be dipped, if desired, by its handle member 72 into a suitable coating material, such as chocolate, caramel, etc., which is fluid at normal room temperatures and congeals upon refrigeration, to form a hard outer protective coating 74 completely enrobing the cracker 68 and frozen edible material 70.

In using the modified apparatus shown in Figs. 9 and 10 to make the confectionery product 76, shown in Fig. 11, the filler member 51 is first positioned over the mold structure 14 in the manner described in connection with the apparatus shown in Figs. 1 to 7. The crackers 78 and 80 are positioned in the molds 24 through those portions of the openings 59 between the dividing members 63 and the sidewalls of the mold 24, which are indicated by the numerals 59a and 59b. The edible semi-frozen or semi-plastic material 70 is placed in the filler pan 53 and squeegeed through the opening 59, including the portions 59a and 59b, into the molds 24 in the identical manner heretofore described. When the molds 24 are completely filled, the filler member 51 may be withdrawn as the material 70 will thereafter serve to maintain the crackers 78 and 80 in their proper positions adjacent the sides of the mold 24. The remaining operations for completing the finished confections are identical to those described for the confection 66, and therefore need not be again repeated herein since they form no part of the present invention.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

What I claim is:

1. Apparatus of the character described for forming and refrigerating a plurality of composite frozen confectionery products simultaneously which includes, in combination, a mold structure comprising an open-top pan having upstanding sidewalls and a plurality of spaced open-top molds depending therefrom, and a filler member comprising an open-top pan adapted to be positioned within the pan of said mold structure having a plurality of correspondingly spaced openings therethrough, each of the openings of the filler member being provided with a downwardly projecting lip member along a portion of its perimeter which extends into its respective mold in spaced relation to the side thereof for protecting and holding an edible cracker adjacent the sidewall of said mold during the filling operation.

2. Apparatus of the character described for forming and refrigerating a plurality of composite frozen confectionery products simultaneously which includes, in combination, a mold structure comprising an open-top pan having upstanding sidewalls and a plurality of spaced open-top molds depending therefrom, and a filler member comprising an open-top pan adapted to be positioned within the pan of said mold structure having a plurality of correspondingly spaced openings therethrough provided with downwardly projecting outlet spouts adapted to engage the sidewalls of the molds over a substantial portion of their perimeter and having a downwardly projecting lip member which extends into said mold in spaced relation to that portion of its sidewall that is not engaged by said outlet spout for protecting and holding an edible cracker adjacent the sidewall of said mold during the filling operation.

3. Apparatus of the character described for forming and refrigerating a plurality of composite confectionery products which includes, in combination, a mold structure comprising an open-top pan having upstanding sidewalls and a plurality of spaced open-top molds depending therefrom, and a filler member comprising an open-top pan having upstanding sidewalls that are adapted to be telescopically positioned within the sidewalls of the mold structure, said filler member having a plurality of spaced openings therethrough which are in alignment with said open-top molds when said filler pan is positioned in said mold pan, said openings having a downwardly projecting lip member along a portion of its perimeter that extends into its respective mold in spaced relation to a portion of the sidewall thereof for protecting and holding an edible cracker adjacent the sidewall of said mold during the filling operation.

4. Apparatus of the character described for forming and refrigerating a plurality of composite confectionery products which includes, in combination, a mold structure comprising an open-top pan having upstanding sidewalls and a plurality of spaced open-top molds depending therefrom, and a filler member comprising an open-top pan having upstanding sidewalls that are adapted to be telescopically positioned within the sidewalls of the mold structure, said filler member having a plurality of spaced openings therethrough which are in alignment with said open-top molds when said filler pan is positioned in said mold pan, said openings each being provided with a downwardly projecting outlet spout adapted to engage closely the sidewall of its respective mold over a substantial portion of its perimeter and having a downwardly projecting lip member which extends into said mold in spaced relation to that portion of its sidewall that is not covered by said outlet spout for protecting and holding an edible cracker adjacent the sidewall of said mold during the filling operation.

5. Apparatus of the character described for forming and refrigerating a plurality of composite confectionery products which includes, in combination, a mold structure comprising an open-top pan having upstanding sidewalls and a plurality of open-top multi-sided molds depending therefrom, and a filler member comprising an open-top pan adapted to be positioned within the pan of said mold structure having a plurality of correspondingly spaced and shaped openings therethrough, each of said openings of the filler member being provided with a downwardly projecting lip member extending along one side thereof which extends into its respective mold in spaced relation to the respective sidewall thereof for protecting and holding an edible cracker adjacent the sidewall of said mold during the filling operation.

6. Apparatus of the character described for forming and refrigerating a plurality of composite confectionery products which includes, in combination, a mold structure comprising an open-top pan having upstanding sidewalls and a plurality of open-top multi-sided molds depending therefrom, and a filler member comprising an open-top pan adapted to be positioned within the pan of said mold structure having a plurality of correspondingly spaced and shaped openings therethrough, each of said openings being provided with downwardly projecting outlet spouts adapted to engage closely the sidewall of its respective mold along all but one side and having along said one side a downwardly projecting lip member which extends into said mold in spaced relation to the corresponding sidewall of said mold for protecting and holding an edible cracker adjacent the sidewall of said mold during the filling operation.

7. Apparatus of the character described comprising a filling member consisting of a pan having a plurality of spaced openings therethrough, each of said openings having a downwardly extending lip member depending along a portion of its perimeter.

8. Apparatus of the character described comprising a filling member consisting of a pan having a plurality of spaced openings therethrough, each of said openings having an outlet spout extending downwardly along a substantial portion of its perimeter and a projecting lip member extending downwardly from that portion of its perimeter that is free of the projecting outlet spout.

9. Apparatus of the character described comprising a filler member consisting of an open-top pan having upstanding sidewalls and a plurality of spaced multi-sided openings therethrough, each of said openings having an outlet spout extending downwardly from a plurality of sides thereof and a projecting lip member extending downwardly from that portion which is free of the outlet spout.

10. Apparatus of the character described comprising a filler member consisting of an open-top pan having a plurality of spaced groups of openings therein, the outer sides of the outer openings of said groups having outlet spouts projecting downwardly therefrom and a common inner side having a projecting lip extending downwardly therefrom to a point below said outlet spouts.

11. Apparatus of the character described comprising a filler member consisting of an open-top pan having upstanding sidewalls and a plurality of spaced openings therethrough, each of said openings being provided adjacent their edges with a depending outlet spout and each of said openings having a dividing member extending across the top thereof which has depending therefrom a downwardly projecting lip member.

12. Apparatus of the character described comprising a filler member consisting of an open-top pan having upstanding sidewalls and a plurality of spaced openings therethrough, each of said openings being provided adjacent their edges with a depending outlet spout and each of said openings having a plurality of spaced dividing members extending across the top thereof each of which has depending therefrom a downwardly projecting lip member.

13. Apparatus of the character described for forming and refrigerating a plurality of composite frozen confectionery products simultaneously which includes, in combination, a mold structure comprising an open-top pan having upstanding sidewalls and a plurality of spaced open-top molds depending therefrom, and a filler member comprising an open-top pan adapted to be positioned within the pan of said mold structure having a plurality of correspondingly spaced openings therethrough provided with downwardly projecting outlet spouts adapted to engage the sidewalls of the molds, each of said openings having a dividing member extending across the top thereof which has depending therefrom a downwardly projecting lip member that extends into its respective mold in spaced relation to the sidewalls thereof for protecting and holding an edible cracker adjacent the sidewall of said mold during the filling operation.

14. Apparatus of the character described for forming and refrigerating a plurality of composite confectionery products which includes, in combination, a mold structure comprising an open-top pan having upstanding sidewalls and a plurality of spaced open-top molds depending therefrom, and a filler member comprising an open-top pan having upstanding sidewalls that are adapted to be telescopically positioned within the sidewalls of the mold structure, said filler member having a plurality of spaced openings therethrough which are in vertical alignment with the open-top molds when said filler pan is positioned in said mold pan, each of said openings having downwardly projecting outlet spouts adapted to engage the sidewalls of its respective mold and each of said openings having a plurality of dividing members extending across the top thereof, each of said dividing members has depending therefrom a downwardly projecting lip member that extends into said mold in spaced relation to the sidewalls thereof for protecting and holding an edible cracker adjacent the sidewall of said mold during the filling operation.

15. Apparatus of the character described for forming and refrigerating a plurality of composite confectionery products which includes, in combination, a mold structure comprising an open-top pan having upstanding sidewalls and a plurality of open-top multi-sided molds depending therefrom, and a filler member comprising an open-top pan adapted to be positioned within the pan of said mold structure having a plurality of correspondingly spaced openings therethrough, each of said openings of the filler member being provided with a plurality of downwardly projecting lip members extending into its respective mold in spaced relation to the sidewall thereof for protecting and holding an edible cracker adjacent the sidewall of said mold during the filling operation.

16. Apparatus of the character described for forming and refrigerating a plurality of composite confectionery products which includes, in combination, a mold structure comprising an open-top pan having upstanding sidewalls and a plurality of open-top multi-sided molds depending therefrom, and a filler member comprising an open-top pan adapted to be positioned within the pan of said mold structure having a plurality of correspondingly spaced and shaped openings therethrough, each of said openings being provided with downwardly projecting outlet spouts adapted to engage closely the sidewalls of its respective mold and having a plurality of downwardly projecting lip members extending into its respective mold in spaced relation to the corresponding sidewalls of said mold for protecting and holding an edible cracker adjacent the sidewall of said mold during the filling operation.

17. Apparatus of the character described for forming and refrigerating a plurality of composite confectionery products which includes, in combination, a mold structure comprising an open-top pan having upstanding sidewalls and a plurality of open-top multi-sided molds depending therefrom, and a filler member comprising an open-top pan adapted to be positioned within the pan of said mold structure having a plurality of correspondingly spaced and shaped openings therethrough, each of said openings being provided with downwardly projecting outlet spouts adapted to engage closely the sidewalls of its respective mold and each of said openings having a plurality of dividing members extending across the top in spaced relation to a side thereof which is provided with a depending lip member that is adapted to extend into the mold in spaced parallel relation to a sidewall thereof for protecting and holding an edible cracker adjacent the sidewall of said mold during the filling operation.

LESTER W. VON LOSBERG.